Figure 1:
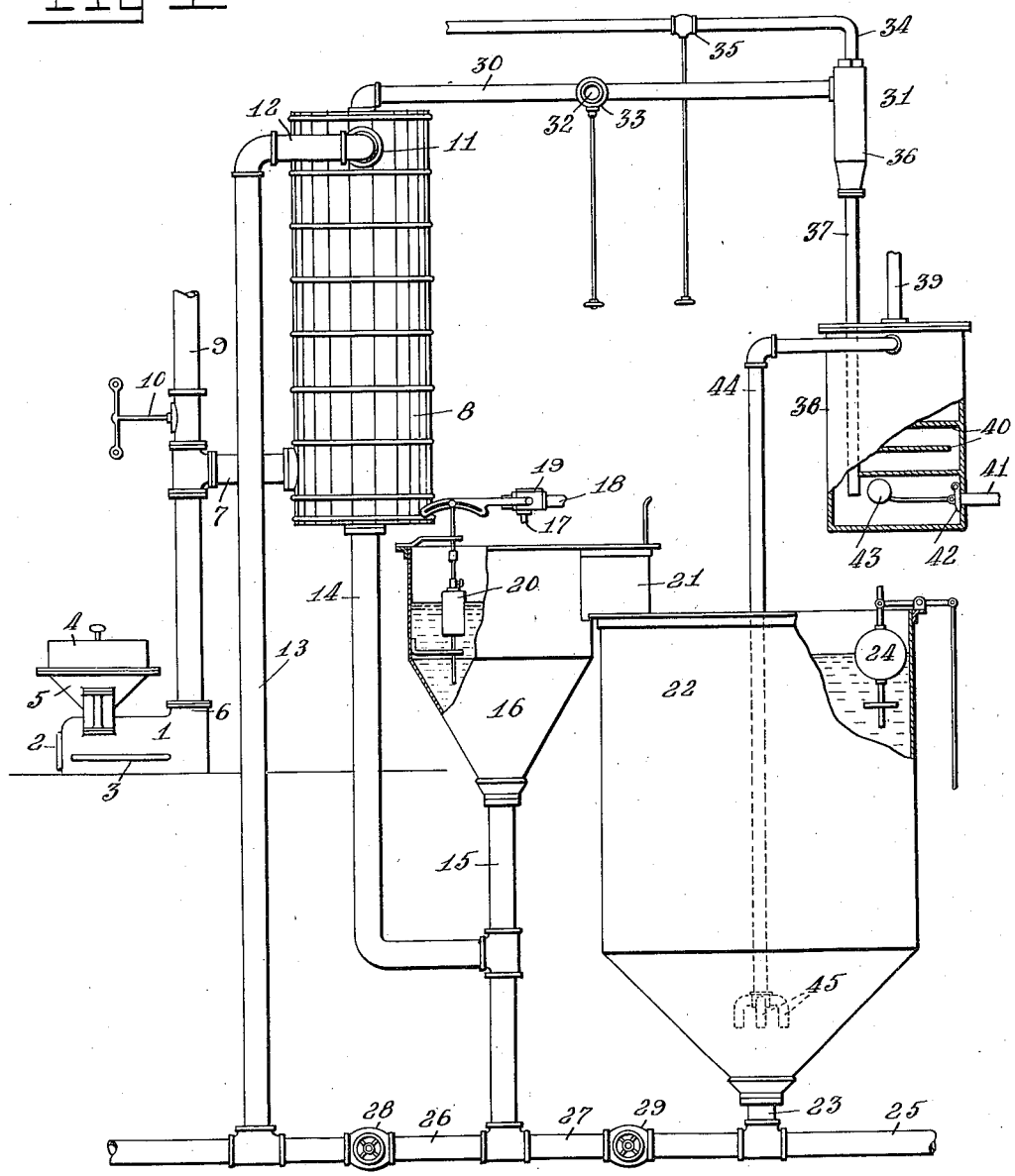

F. E. COOMBS.
MUTUAL TREATMENT OF LIQUIDS AND GASES.
APPLICATION FILED APR. 15, 1913.

1,217,156.

Patented Feb. 27, 1917.
2 SHEETS—SHEET 1.

Witnesses
H. E. Robinson
George McDaniel

Inventor
Frank E. Coombs
By McElroy & Steward
his Attorneys

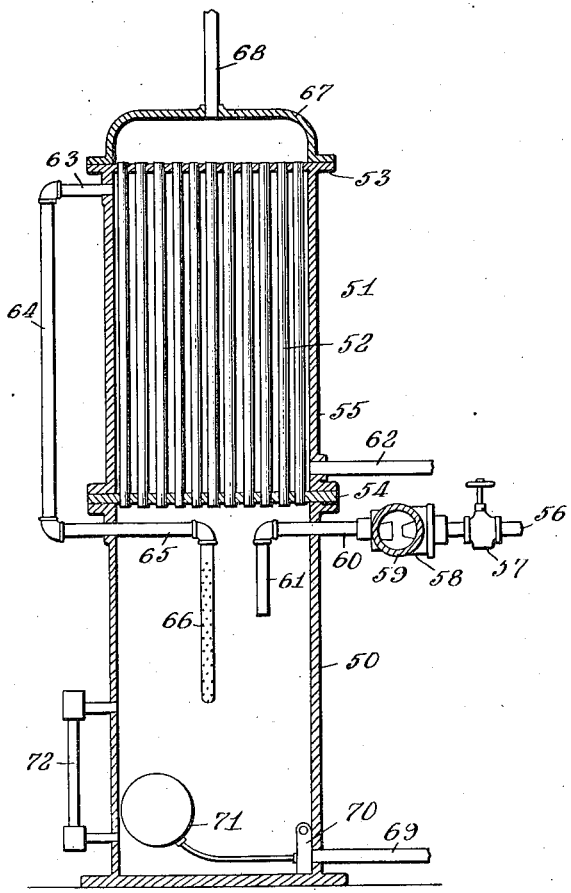

UNITED STATES PATENT OFFICE.

FRANK E. COOMBS, OF AU SABLE FORKS, NEW YORK.

MUTUAL TREATMENT OF LIQUIDS AND GASES.

1,217,156.  Specification of Letters Patent.  Patented Feb. 27, 1917.

Application filed April 15, 1913. Serial No. 761,287.

*To all whom it may concern:*

Be it known that I, FRANK E. COOMBS, a citizen of the United States, residing at Au Sable Forks, in the county of Essex and State of New York, have invented certain new and useful Improvements in Mutual Treatment of Liquids and Gases, of which the following is a specification.

This invention relates to mutual treatment of liquids and gases; and it comprises a process wherein a gas or vapor is caused to travel as a suitably induced current through, or otherwise in contact with, a liquid which it is desired to treat with such gas or vapor, the residual gas remaining after passage in contact with such liquid being then mingled with a fluid medium by means of whose entraining action the current of gas is induced, undesirable constituents of the resulting mixture are removed to a desired degree as by condensation or the like, and the resulting residual gas or mixture of gases is then employed to perform useful work for which the composition or condition of the gas as finally obtained renders such gas particularly suited.

In treating liquids with gases, it has been customary heretofore in many cases to draw the gas from any suitable source by means of a steam injector, and then force the resulting mixture of steam and treating gas into the liquid to be treated. Such methods of operation have been common, for example, in impregnating liquids with such gases as sulfur dioxid, chlorin, carbon dioxid, etc. Occasionally also, gases have been drawn through or over liquids by the inductive action of a steam injector or the like. Where a mixture of a treating gas and steam are forced into the liquid to be treated, as in the first example cited, steam condenses in the liquid to be treated; and as the liquid treated is usually an aqueous solution of some material to be reacted upon by the treating gas, the concentration of the solution is of course necessarily decreased. Such a dilution of the solution is usually undesirable since it entails subsequent evaporation and concentration with its attendant cost and expenditure of time. Where the gas is drawn through the liquid to be treated, the gases remaining unabsorbed after contact with the liquid pass into the intake or suction side of the injector and are expelled by the injector in company with the steam; and hitherto, this expelled mixture of gases and steam has been discharged to waste. Obviously, since this mixture is discharged under pressure, a very considerable quantity of available energy has thus been lost.

According to the process of the present invention, a treating gas is drawn as an induced current through or in contact with a body of liquid to be treated, the flow of gas being maintained by means of a steam injector or a similar device. The residual gas which has escaped absorption in the liquid passes to the intake of the injector where it joins the steam by whose entraining action the flow of gas has been induced. The mixture of steam and residual gases discharged under pressure from the injector is then suitably treated to condense the steam, and the relatively dry gas, or mixture of gases, resulting from this treatment is then usefully employed, as for example, as by using it to effect agitation of a liquid whose dilution with water would be disadvantageous.

While the present process is capable of application in many connections, it is particularly adapted to the impregnation of a liquid such as water or an aqueous solution with sulfur dioxid. And it is especially suited to the sulfitation of liquids obtained in the manufacture of sugar for the purpose of clarifying, decolorizing and otherwise improving the same. The process will therefore be described, for the sake of illustration, in this last named application.

In carrying out the present process as applied to the sulfitation of saccharine liquids, sulfur dioxid fumes are generated by burning sulfur in a suitable stove or burner having inlet openings for the admission of air and having an exit conduit for the discharge of sulfur dioxid. This conduit may lead to any suitable absorption device, such as a cascade apparatus or tower containing baffle plates, through which descend films of the sugar-containing liquid. The sulfur dioxid fumes are drawn upwardly from the burner through the absorption apparatus by means of a steam injector, (or, more accurately, ejector) and in passing through this absorption apparatus a large proportion of the contained sulfur dioxid is taken up by the descending liquid.

The gases drawn by the ejector from the absorption tower contain a large proportion of nitrogen from the air used in the combustion of the sulfur, together with some unabsorbed sulfur dioxid, more or less free oxygen, and other gases. The unabsorbed gases are entrained by the stream of steam fed to the injector under pressure, the gases being discharged from the ejector in mixture therewith. This mixture of steam and unabsorbed gases is conducted under pressure to a surface or other condenser, whereby the steam is condensed to any extent desired. The condensed water is trapped off and the residual gases which are relatively dry are led from the condenser and may be introduced into a tank containing juice which it is desired to agitate. For example, the liquid which has passed through the cascade absorber may be collected in the tank, and may there be agitated by means of the dried gas led from the condenser under pressure, to obtain a homogeneous mixture, or in order to mingle the liquid with other reagents, such as lime, etc., which may be added, so that the agitated liquor may be tested and changes of the degree of sulfitation, etc., properly made.

The apparatus employed in carrying out the foregoing process may vary considerably in its details. Broadly speaking it should comprise means for generating the treating fumes or gases, an absorption apparatus, an injector or ejector device for drawing the treating gas through the absorption apparatus, means for subsequently treating and altering the character of the gases expelled from the ejector, and means for utilizing the resulting treated gas mixture.

In the accompanying drawings I have illustrated an embodiment of apparatus elements suitable for use in the present invention. In these drawings—

Figure 1 is a diagrammatic elevation of a complete plant for sulfuring sugar-containing liquids according to the present process, parts of the apparatus being broken away and in section; and Fig. 2 is a sectional elevation of a type of ejector-compressor especially useful for the purposes of the invention.

Referring to the drawings, 1 is a sulfur stove or burner of any suitable type, provided with door 2 and air inlets 3. The burner here illustrated is surmounted by a sulfur melter 4 arranged to feed molten sulfur through funnel 5 into the burner. Leading from the burner is gas outlet 6 branching at 7 to enter the lower part of drum 8, which may be any suitable type of absorbing device such as a baffle or cascade absorbing tower. Extension 9 of the gas outlet conduit leads to any convenient place of discharge and is provided with damper 10.

The drum or absorber is provided near its top with liquid inlet 11 for the introduction of juice supplied through pipes 12 and 13 from any suitable source. A discharge pipe 14 leads to the pipe 15 which enters the bottom of liming tank 16, to which tank milk of lime may be fed through outlet 17 in proper proportions from supply pipe 18, the rate of supply being governed by valve 19 operated by float 20.

The liming tank has an overflow outlet 21 discharging into a blending or agitating tank 22, from whose base leads pipe 23 having a valve 24' controlled by a constant level float 24. Pipe 25 conveys treated juice to any convenient point. Pipes 26 and 27, gated at 28 and 29, respectively, are provided for by-passing the absorber and liming tank when desirable or necessary.

From the upper end of the drum, conduit 30 leads to ejector 31, and is provided at 32 with an inlet opening controlled by valve 33. The ejector has a steam supply pipe 34 controlled by valve 35. The steam supply pipe terminates in a suitable nozzle or the like within casing 36; while pipe 37 leads to a condenser 38. This condenser may be of any suitable structure; in this instance it is provided at its upper end with inlet 39 for cooling water and interior baffles 40 are arranged in its interior to provide a large condensing surface. Water outlet 41 leads from the lower part of the condenser and is provided with valve 42 controlled by float 43.

Pipe 44 serves to conduct gases from the upper portion of the condenser and introduce the same into the lower part of tank 22 through jets or nozzles 45.

In employing the described apparatus for carrying out the process of the present invention, sulfur is burned in the stove 1, the necessary amount of air for combustion being admitted through inlets 3. The ejector being set in operation, the mixture of sulfur dioxid and other gases resulting from the combustion in the sulfur burner is drawn through conduits 6 and 7 into the lower part of the absorber, passing upwardly against sugar juice introduced into the absorber at 11 and descending against the upwardly flowing current of gases. The liquid absorbs a considerable portion of the sulfur dioxid contained in the fumes coming from the burner and is then discharged from the bottom of the absorber through pipe 14, passing thence into liming tank 16 where a suitable proportion of milk of lime is added, the mixture then overflowing into the blending tank.

The gases which have escaped absorption by the liquid in the drum are drawn by the ejector through conduit 30, and are discharged under pressure through pipe 37 into the condenser, being admixed with a large proportion of steam from the ejector. In the condenser the temperature of the mixture is kept so low by the cooling water supplied thereto, that practically all of the steam is condensed, the condensation water as well as the spent cooling water being automatically trapped off through the outlet 41 by operation of the float valve.

The mixed gases substantially free of moisture and still under pressure pass from the condenser through pipe 44 and are introduced below the level of the liquid contained in the receiving tank 22. The compressed dry gases thus introduced into the receiving tank serve to thoroughly agitate the liquid and thoroughly homogenize the mixture of juice and milk of lime; but since the gases are practically free of moisture, the liquid is not diluted by this introduction of the gases obtained from the ejector. Not only are agitation and thorough mixing thus effected, but since the gases from the ejector still contain some sulfur dioxid which has escaped absorption in the absorbing drum, the liquid in the receiving tank thus receives a kind of secondary or supplementary sulfitation which is of considerable advantage.

Tempered juice flows from the blending tank through pipes 23 and 25 to any convenient place, the liquid level in the tank being mantained constant, if desired, by means of the float valve arrangement described.

If it is necessary at any time to stop the flow of sulfur dioxid fumes through the absorbing drum, the ejector may be stopped and the damper in pipe 9 may be opened whereby fumes from the burner will pass directly to any convenient place of discharge.

In operating sulfur burners in connection with sulfitation plants of the character above described, it is a matter of considerable difficulty to obtain continuous and dependable combustion of the sulfur in a regulable way. Great care must be taken that there is always a positive suction on the burner in order that there shall be a proper supply of air entering at the burner inlets. It is however necessary to vary from time to time the volume of gases to be drawn through the absorber. If it be attempted to vary this flow by varying the quantity of steam supply to the ejector, difficulties are frequently encountered, because of the fact that variations in steam supply have an exaggerated influence on the force due to the impulse of the steam jet. For example, if it be attempted to moderate the suction through the absorber by decreasing the steam supply to the ejector nozzle, this cannot be done without unduly reducing the efficiency of the ejector. In many cases, while the steam continues to pass the nozzle in large quantities, there is not enough pressure to overcome resistance in front of the nozzle, and the steam backs through the suction conduit away from the ejector and interferes with or extinguishes the combustion in the burner. Similarly if the ejector be connected to a gas producer, this method of regulating the draft produces similar undesirable results.

To overcome this difficulty I provide the inlet opening or openings 32 in the piping between the ejector and the absorber as above described. By suitably operating the controlling valve, this opening will therefore function as a means for governing the quantity of gases drawn by the ejector through the absorber without in any way annulling the effectiveness of the ejector, or the useful employment of the compressed gases forced into the agitating tank 22. When valve 33 is opened, a regulated quantity of air is drawn into pipe 30 by the ejector, and a correspondingly less quantity of gases is drawn through the drum 8. At the same time, there is always a certain amount of suction on the sulfur burner, thus insuring its continuous operation.

In Fig. 2 of the drawings I have illustrated a somewhat different type of ejector-compressor from that shown in Fig. 1; a type which I find to be particularly adapted to the purposes of the present invention. In Fig. 2, the apparatus comprises a lower chamber 50 surmounted by a surface condenser 51 comprising a nest of tubes 52 held in position by upper and lower tube-sheets 53 and 54, respectively, and surrounded by jacket 55. A steam supply pipe 56 valved at 57 operates ejector 58 having an intake or suction pipe 59. The ejector discharges through pipes 60 and 61 into the lower chamber of the apparatus. A water inlet pipe 62 leads into the lower portion of the jacket around the nest of tubes 52, while outlet 63 conveys the cooling water after passage in contact with the pipes downwardly and discharges the same through pipes 64 and 65 and perforated spray pipe 66 into the lower chamber at a point adjacent to the ejector discharge. The upper ends of the nested tubes open into a chamber covered by a cap 67 from which leads gas outlet pipe 68 for leading off dried gases under pressure. A pressure regulator of any suitable type (not shown) may be connected to outlet pipe 68 and to steam valve 57, whereby the quantity of steam admitted to the ejector may be automatically varied according to the pressure in said outlet pipe.

The lower chamber of the apparatus is provided near its bottom with liquid discharge outlet 69 governed by a valve 70 which is controlled by float mechanism 71. Water glass 72 is also provided for indicating the height of liquid in the chamber.

In employing this modified type of injector and condenser, the intake 59 is connected to the apparatus through which the treating gas is to be drawn, while the outlet pipe 68 is connected to the apparatus in which the compressed and dried gases are to be utilized; in the present instance, to the blending or agitating tank 22. The mixture of steam and gases enters the lower chamber of the apparatus where it meets a spray of water issuing from perforated pipe 66. Most of the steam is condensed at this point; and any steam which may survive this treatment passes upwardly with the other gases through the tubes 52 which are cooled by the necessary quantity of cooling water admitted through 62. After passing through these tubes the gases are practically free of moisture and may then be supplied, still under pressure, through pipe 68 to the place of use. The cooling water employed in this apparatus is thus utilized very effectively. Entering the apparatus at its lowest temperature, it first cools the tubes 52 through which are passing the gases which have been partially cooled and dried in the lower part of the apparatus. The water then flows at a somewhat higher temperature through pipes 63, 64 and 65, and is sprayed through 66 directly against the incoming and relatively hot mixture of steam and gases coming from the ejector.

What I claim is:

1. In the treatment of liquids with mixed gases containing gases reactive with such liquid, the process which comprises drawing such a gas through or over such a liquid by the suction of a fluid driven ejector, removing the fluid beyond the ejector and passing the residual gases while still under pressure through a body of such a liquid.

2. In the treatment of liquids with mixed gases, the process which comprises drawing such a gas through or over such a liquid by the suction of a steam driven ejector, removing the steam beyond the ejector and passing the residual compressed gases through a body of such a liquid.

3. In the treatment of liquids with sulfur dioxid, the process which comprises drawing fumes comprising such dioxid through or over such a liquid by the suction of a steam driven ejector, removing the steam beyond the ejector and passing the residual compressed gases through a body of such a liquid.

4. The process of sulfuring saccharine liquids which comprises drawing fumes comprising sulfur dioxid through such a liquid by means of a steam ejector, condensing out steam from the compressed gaseous mixture discharged from the ejector, and introducing the resultant gaseous mixture, substantially free of moisture and still under pressure, into a previously sulfured saccharine liquid to effect agitation and homogeneous composition thereof.

5. The process of treating liquids with gases which comprises drawing a treating gas through or in contact with a liquid with the aid of a fluid-actuated ejector device, and varying the volume of gas thus drawn through the liquid by varying the quantity of a fluid supplied to the suction side of the ejector device at a point intermediate said liquid and said device.

6. The process of treating liquids with gases which comprises burning sulfur to produce fumes of sulfur dioxid, drawing such fumes as an induced current through or in contact with a liquid to be sulfured by means of a steam ejector, and varying the rate of sulfur combustion and the volume of the induced current of fumes by admitting variable quantities of air to the suction side of the ejector intermediate the ejector and the liquid being treated.

In testimony whereof, I affix my signature in the presence of two subscribing witnesses.

F. E. COOMBS.

Witnesses:
 FRED E. BLACKWELL,
 R. M. WOOLSEY.